US009933677B2

(12) United States Patent
Nakamura

(10) Patent No.: US 9,933,677 B2
(45) Date of Patent: *Apr. 3, 2018

(54) LIQUID CRYSTAL DEVICE AND ELECTRONIC APPARATUS

(71) Applicant: Seiko Epson Corporation, Tokyo (JP)

(72) Inventor: Teiichiro Nakamura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,799

(22) Filed: Apr. 17, 2017

(65) Prior Publication Data

US 2017/0219898 A1    Aug. 3, 2017

Related U.S. Application Data

(63) Continuation of application No. 13/735,332, filed on Jan. 7, 2013, now Pat. No. 9,651,831.

(30) Foreign Application Priority Data

Jan. 12, 2012  (JP) ................................. 2012-003917

(51) Int. Cl.
  *G02F 1/1343*  (2006.01)
  *G02F 1/1345*  (2006.01)
  (Continued)

(52) U.S. Cl.
  CPC ...... *G02F 1/136286* (2013.01); *G02F 1/1333* (2013.01); *G02F 1/1345* (2013.01);
  (Continued)

(58) Field of Classification Search
  CPC ....... G02F 2001/13456; G02F 1/13454; G02F 1/13452; G02F 1/1345
  See application file for complete search history.

(56) References Cited

U.S. PATENT DOCUMENTS 5,825,449 A    10/1998  Shin
6,262,702 B1    7/2001  Murade
(Continued)

FOREIGN PATENT DOCUMENTS

JP    11-265162 A    9/1999
JP    2002-040486 A    2/2002
(Continued)

OTHER PUBLICATIONS

Non-Final Office Action received in U.S. Appl. No. 13/735,332; dated Feb. 26, 2015.
(Continued)

*Primary Examiner* — Jessica M Merlin
(74) *Attorney, Agent, or Firm* — ALG Intellectual Property, LLC

(57) ABSTRACT

A liquid crystal device including a first connection terminal electrically connected to a first signal supply line that supplies a signal to a data line driving circuit, a second connection terminal electrically connected to a second signal supply line that supplies a signal to a scanning line driving circuit, and a third connection terminal electrically connected to a peripheral electrode line, which is electrically connected to a pixel peripheral electrode disposed between a pixel region and the scanning line driving circuit, and between the pixel region and the data line driving circuit. The third connection terminal is disposed between the first connection terminal, and the second connection terminal. The peripheral electrode line is disposed so as not to planarly intersect with at least a partial line of a first signal supply line and the second signal supply line.

14 Claims, 10 Drawing Sheets

(51) Int. Cl.
*G02F 1/1362* (2006.01)
*G02F 1/1335* (2006.01)
*G02F 1/1333* (2006.01)

(52) U.S. Cl.
CPC .. *G02F 1/134309* (2013.01); *G02F 1/134336* (2013.01); *G02F 1/133512* (2013.01); *G02F 2001/13629* (2013.01); *G02F 2001/133388* (2013.01)

(56) References Cited

U.S. PATENT DOCUMENTS

| | | | |
|---|---|---|---|
| 6,531,996 | B1 | 3/2003 | Murade |
| 7,002,658 | B2 | 2/2006 | Komeno et al. |
| 7,116,390 | B2 | 10/2006 | Murade |
| 7,999,897 | B2 | 8/2011 | Oyamada |
| 8,081,153 | B2 | 12/2011 | Shirasaka et al. |
| 9,651,831 | B2 * | 5/2017 | Nakamura ........ G02F 1/134309 |
| 2001/0022572 | A1 | 9/2001 | Murade |
| 2001/0050799 | A1 | 12/2001 | Murade |
| 2004/0159839 | A1 | 8/2004 | Murade |
| 2004/0160399 | A1 | 8/2004 | Murade |
| 2005/0023521 | A1 | 2/2005 | Murade |
| 2005/0057467 | A1 | 3/2005 | Fujita |
| 2005/0230757 | A1 | 10/2005 | Nagasawa et al. |
| 2005/0285995 | A1 | 12/2005 | Kim |
| 2006/0181500 | A1 | 8/2006 | Murade |
| 2008/0055529 | A1 | 3/2008 | Shirasaka et al. |
| 2011/0234957 | A1 | 9/2011 | Watanabe et al. |

FOREIGN PATENT DOCUMENTS

| | | |
|---|---|---|
| JP | 2002-196355 A | 7/2002 |
| JP | 2003-029287 A | 1/2003 |
| JP | 2003-172944 A | 6/2003 |
| JP | 2005-018031 A | 1/2005 |
| JP | 2005-309003 A | 11/2005 |
| JP | 2008-058497 A | 3/2008 |
| JP | 2009-265622 A | 11/2009 |
| JP | 2010-128253 A | 6/2010 |

OTHER PUBLICATIONS

Final Office Action received in U.S. Appl. No. 13/735,332; dated Aug. 21, 2015.
Non-Final Office Action received in U.S. Appl. No. 13/735,332; dated Apr. 6, 2016.
Final Office Action received in U.S. Appl. No. 13/735,332; dated Sep. 23, 2016.
Notice of Allowance received in U.S. Appl. No. 13/735,332; dated Jan. 12, 2017.

* cited by examiner

LIQUID CRYSTAL DEVICE AND ELECTRONIC APPARATUS

CROSS-REFERENCE TO RELATED APPLICATIONS

The present application is a continuation application of U.S. patent application Ser. No. 13/735,332 filed Jan. 7, 2013, which claims priority from Japanese Patent Application No. 2012-003917 filed on Jan. 12, 2012, each of which are expressly incorporated by reference herein.

BACKGROUND

1. Technical Field

The present invention relates to a liquid crystal device and an electronic apparatus.

2. Related Art

As a liquid crystal device, for example, it is known that the liquid crystal device of active driving type includes a transistor for each pixel as an element which controls to switch a pixel electrode. The liquid crystal device, for example, is used as a liquid crystal light valve in a liquid crystal projector.

In the above-described liquid crystal device, it is known that ionic impurity which is mixed during liquid crystal injection or eluted from a seal member surrounding a liquid crystal layer is spreading or cohering in a pixel region and thereby a display quality is deteriorated.

Accordingly, as described in JP-A-2008-58497, there is disclosed a technology in which plural electrodes are provided around the pixel region, and impurity ions are moved outside the pixel region by changing the potential between the electrodes, and thereby the display quality is improved.

However, in JP-A-2008-58497, while an electrode provided around the pixel region is disclosed, the line position of a terminal connected to the electrode or a layout of a connection line connecting the electrode to the terminal is not disclosed. Furthermore, in a case where the connection line is planarly intersected (bridged) with another line, if an electrostatic breakdown occurs between the lines during the manufacturing process, defects such as broken lines and short circuits easily occur, and there is a problem that a yield may decrease.

SUMMARY

The invention can be realized in the following forms or application examples.

Application Example 1

According to Application Example 1, there is provided a liquid crystal device including: an element substrate that has a pixel region; a counter substrate disposed so as to be opposite the element substrate; a seal member that bonds the element substrate and the counter substrate; and a liquid crystal layer interposed between the element substrate and the counter substrate, wherein the element substrate includes a plurality of data signal supply lines that supply a signal to a data line driving circuit; a plurality of first connection terminals electrically connected to each of the plurality of data signal supply lines; a plurality of scan signal supply lines that supply a signal to a scanning line driving circuit; a plurality of second connection terminals electrically connected to each of the plurality of scan signal supply lines; a pixel peripheral electrode disposed between the pixel region and the seal member; a peripheral electrode line electrically connected to the pixel peripheral electrode; and a third connection terminal electrically connected to the peripheral electrode line, wherein the third connection terminal is disposed between the plurality of first connection terminals and the plurality of second connection terminals, and wherein the peripheral electrode line is disposed so as not to planarly intersect with at least a part of the lines among the plurality of data signal supply lines and the plurality of scan signal supply lines.

According to Application Example 1, the third connection terminal electrically connected to the peripheral electrode line is disposed between the first connection terminal electrically connected to the data signal supply line, and the second connection terminal electrically connected to the scan signal supply line, and the data signal supply line, the scan signal supply line and the peripheral electrode line are disposed so as not to intersect one another. Therefore, electrostatic breakdown occurring between the lines when intersected can be prevented. In addition, an adequate voltage can be applied to the pixel peripheral electrode, and display unevenness (blotches) can be suppressed from occurring in the pixel region.

Application Example 2

According to Application Example 2, there is provided a liquid crystal device including: an element substrate that has a pixel region; a counter substrate disposed so as to be opposite the element substrate; a seal member that bonds the element substrate and the counter substrate; and a liquid crystal layer interposed between the element substrate and the counter substrate, wherein the element substrate includes a plurality of data signal supply lines that supply a signal to each of a plurality of data lines; a plurality of first connection terminals electrically connected to each of the plurality of data signal supply lines; a plurality of scan signal supply lines that supply a signal to a scanning line driving circuit; a plurality of second connection terminals electrically connected to each of the plurality of scan signal supply lines; a pixel peripheral electrode disposed between the pixel region and the seal member; a peripheral electrode line electrically connected to the pixel peripheral electrode; and a third connection terminal electrically connected to the peripheral electrode line, wherein the third connection terminal is disposed between the plurality of first connection terminals and the plurality of second connection terminals, and wherein the peripheral electrode line is disposed so as not to planarly intersect with at least a part of the lines among the plurality of data signal supply lines and the plurality of scan signal supply lines.

According to Application Example 2, the third connection terminal electrically connected to the peripheral electrode line is disposed between the first connection terminal electrically connected to the data signal supply line, and the second connection terminal electrically connected to the scan signal supply line, and the data signal supply line, the scan signal supply line and the peripheral electrode line are disposed so as not to intersect one another. Therefore, the electrostatic breakdown occurring between the lines when intersected can be prevented. In addition, an adequate voltage can be applied to the pixel peripheral electrode, and the display unevenness (blotches) can be suppressed from occurring in the pixel region.

Application Example 3

In the liquid crystal device according to the above-described Application Examples, the scan signal supply lines and the data signal supply lines may include a power supply line and a pulse signal line, and the peripheral electrode line may be disposed so as not to planarly intersect with the pulse signal line.

According to Application Example 3, since the peripheral electrode line is disposed so as not to planarly intersect with at least the pulse signal line, noise from the pulse signal line may be suppressed from being added to the peripheral electrode line. Specifically, the line to which a low frequency signal or a large amplitude signal is supplied may be disposed so as not to intersect the peripheral electrode line. Accordingly, the pixel peripheral electrode may be operated by a normal voltage. In other words, a power supply line to which noise is hardly added may intersect the peripheral electrode line. As a result, the blotches can be suppressed from occurring in the pixel region.

Application Example 4

In the liquid crystal device according to the above-described Application Examples, the peripheral electrode line may be disposed so as not to planarly overlap with a start pulse signal line and the scan signal supply line between at least the start pulse signal line among the data signal supply lines, and the scan signal supply line.

According to Application Example 4, since the peripheral electrode line is disposed so as not to planarly overlap with at least the start pulse signal line, noise can be suppressed from being carried on the peripheral electrode line, which is caused by being intersected with the line to supply the start pulse with delayed frequency. In addition, Application Example 4 may be applied to a liquid crystal device in which the data line driving circuit receiving the start pulse is embedded.

Application Example 5

In the liquid crystal device according to the above-described Application Examples, the peripheral electrode line may be disposed so as not to planarly overlap with a selector signal line and a scan signal supply line between at least the selector signal line among the data signal supply lines, and the scan signal supply line.

According to Application Example 5, since the peripheral electrode line is disposed so as not to planarly overlap with at least the selector signal line, noise can be suppressed from being carried on the peripheral electrode line, which is caused by being intersected with the selector signal line with a large amplitude. In addition, Application Example 4 may be applied to a liquid crystal device to which the data line driving circuit is externally attached.

Application Example 6

In the liquid crystal device according to the above-described Application Examples, the pixel peripheral electrode may be disposed to be connected so as to surround the pixel region.

According to Application Example 6, since the pixel peripheral electrode is disposed to be connected so as to surround the pixel region, the blotches can be suppressed from occurring without being affected by the position inside the pixel region. In other words, at least four corners of the pixel region may be protected.

Application Example 7

In the liquid crystal device according to the above-described Application Examples, the pixel peripheral electrode may be provided in the same layer as a pixel electrode.

According to Application Example 7, since the pixel peripheral electrode is formed from the same material as the pixel electrode configured by ITO (Indium Tin Oxide), for example, it may be manufactured without an increase in new manufacturing processes.

Application Example 8

In the liquid crystal device according to the above-described Application Examples, the peripheral electrode line may be electrically connected to a portion close to the pixel region in the pixel peripheral electrode.

According to Application Example 8, for example, since the peripheral electrode line using aluminum having a lower resistance than ITO is extended to the portion close to the pixel region and then electrically connected to the pixel peripheral electrode configured by ITO, the peripheral electrode line and the pixel electrode may be connected with each other using relatively low resistance.

Application Example 9

According to Application Example 9, there is provided an electronic apparatus including the above-described liquid crystal device.

According to Application Example 9, since above-described liquid crystal device is provided, display defects caused by the electrostatic breakdown or noise may be suppressed, and there may be provided an electronic apparatus in which display quality is able to be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, specific embodiments of the present invention will be described with reference to the drawings. Here, the drawings to be used are illustrated by being enlarged or reduced as appropriate, so as to be in a state where the described portions are recognizable.

Here, in the following forms, for example, when representing "on the board", it indicates that it is disposed so as to contact the board, disposed over the board through another component, or disposed on the board so that a portion thereof may be in contact with the board and another portion thereof may be in contact with the board through the other component.

First Embodiment

The present embodiment will be described by way of an example of an active matrix type liquid crystal device that uses thin film transistors as pixel switching elements. For example, this liquid crystal device may be suitably used as an optical modulator (a liquid crystal light valve) in a projection type display device (a liquid crystal projector) described later.

Liquid Crystal Device

Figure 1:
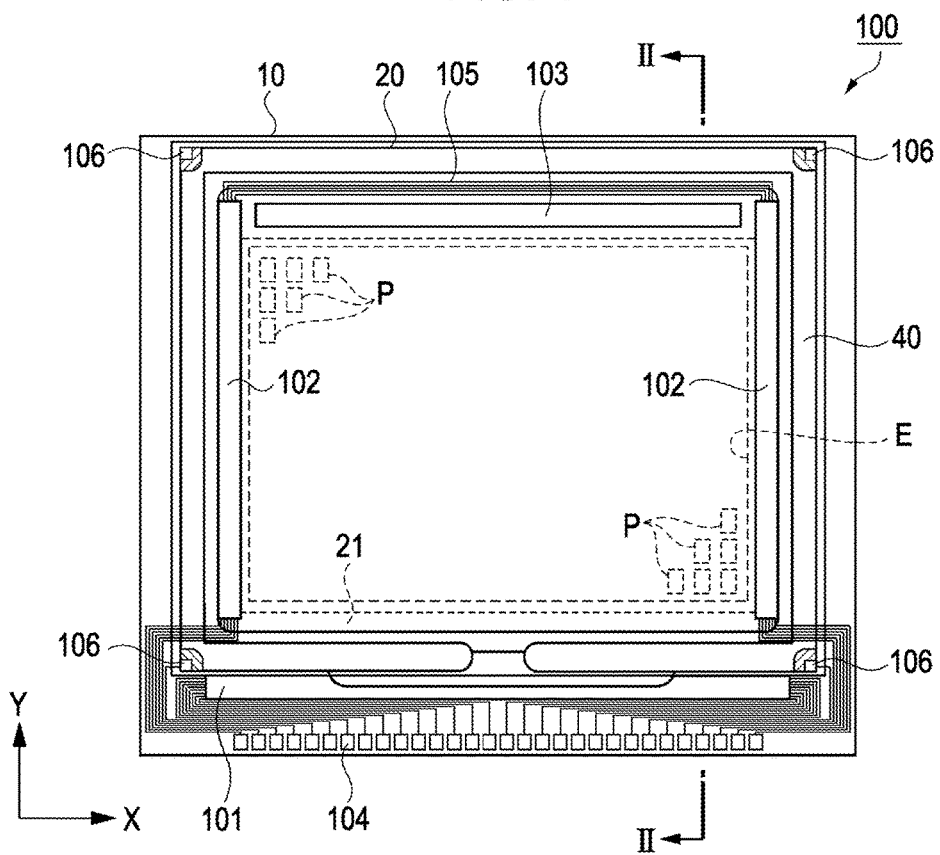
FIG. 1 is a schematic plan view illustrating a configuration of a liquid crystal device according to a first embodiment.
Figure 2:
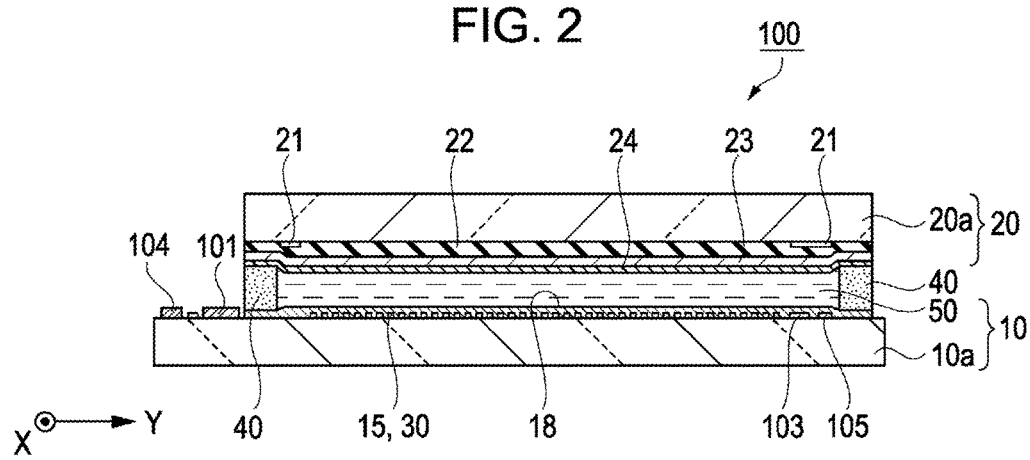
FIG. 2 is a schematic cross-sectional view taken along a line II-II of a liquid crystal panel illustrated in FIG. 1.
Figure 3:
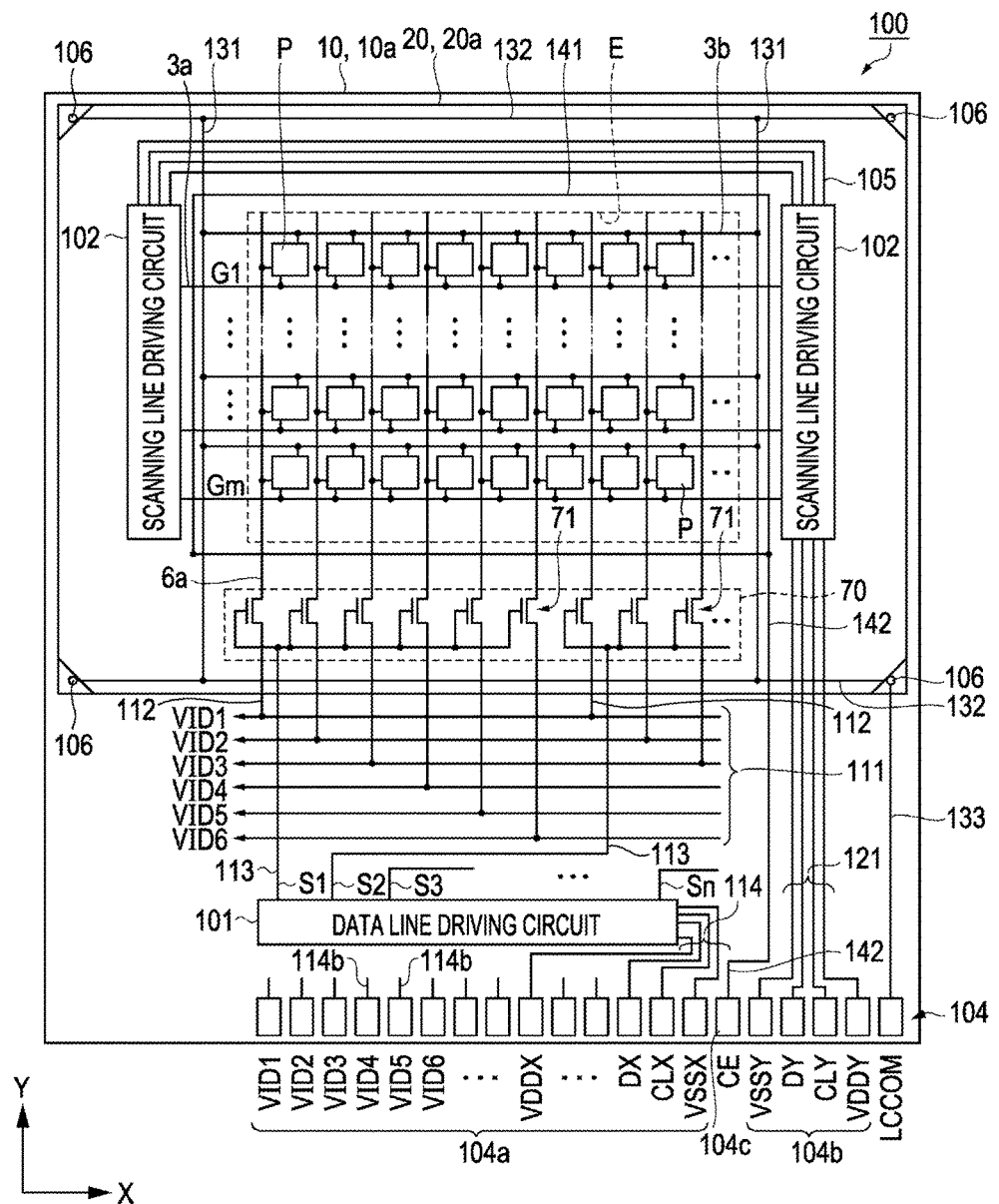
FIG. 3 is a circuit diagram illustrating an electric configuration of the liquid crystal device.
Figure 4:
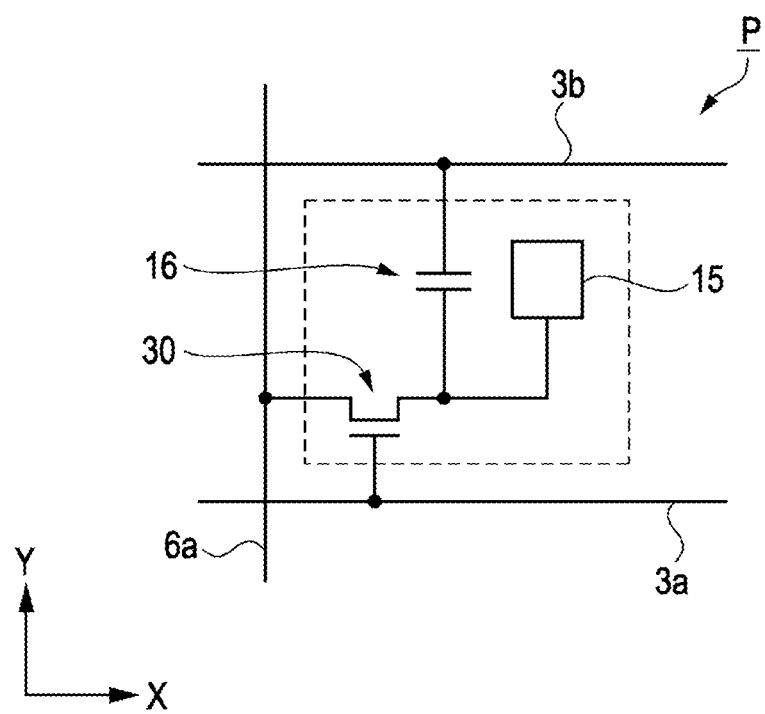
FIG. 4 is an equivalent circuit diagram illustrating an electric configuration of a pixel.
Figure 5:
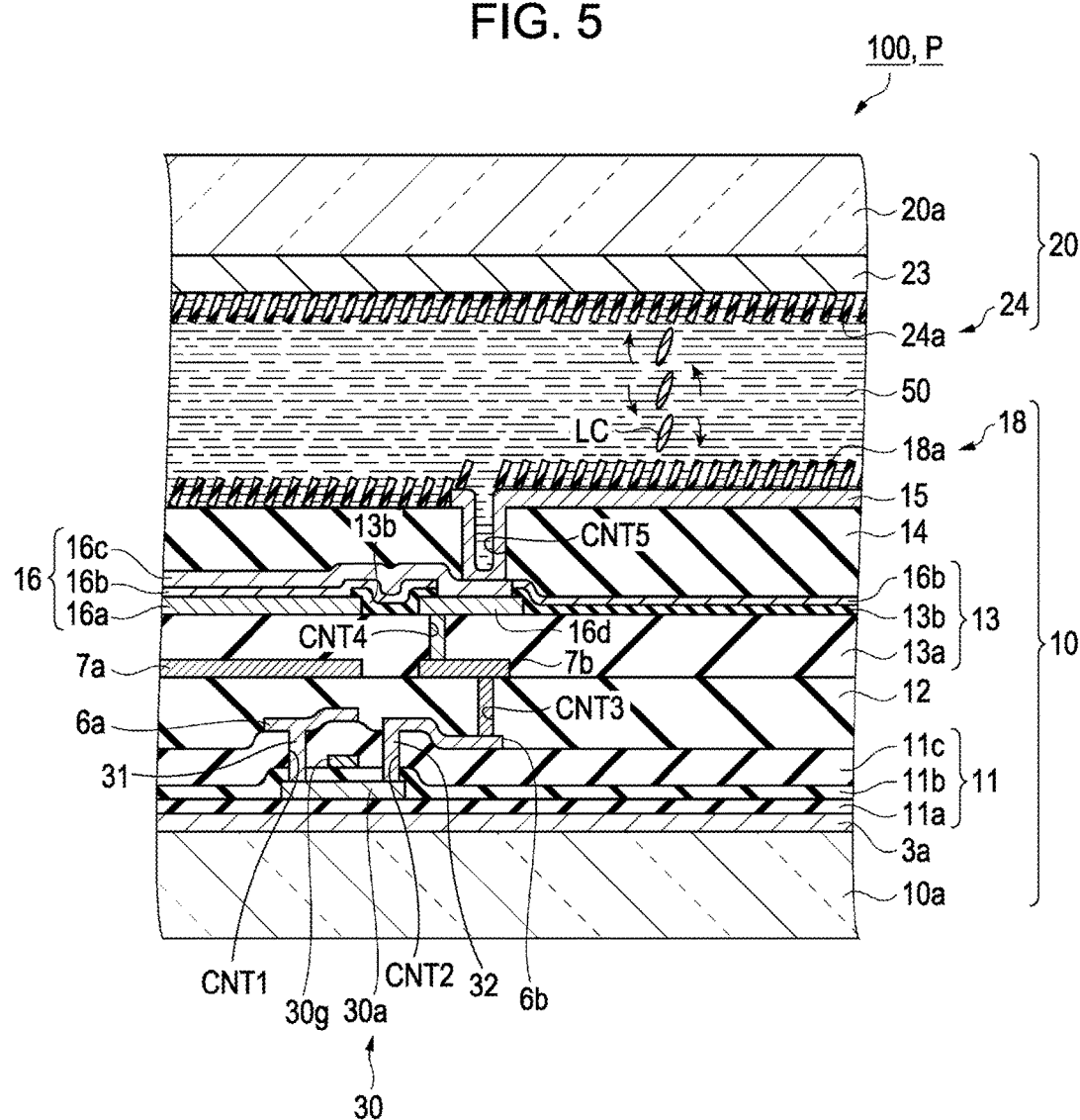
FIG. 5 is a schematic cross-sectional view illustrating a pixel structure.

In addition, the liquid crystal device according to the present embodiment will be described with reference to FIGS. 1 to 5. FIG. 1 is a schematic plan view illustrating a configuration of the liquid crystal device. FIG. 2 is a schematic cross-sectional view taken along the line II-II of a liquid crystal panel illustrated in FIG. 1. FIG. 3 is a circuit diagram illustrating an electric configuration of the liquid crystal device. FIG. 4 is an equivalent circuit diagram illustrating an electric configuration of a pixel. FIG. 5 is a schematic cross-sectional view illustrating a pixel structure of the liquid crystal device.

As illustrated in FIGS. 1 and 2, the liquid crystal device 100 according to the present embodiment includes an element substrate 10 and a counter substrate 20 opposite each other, and a liquid crystal layer 50 interposed by a pair of boards. A first base member 10a configuring the element substrate 10 and a second base member 20a configuring the counter substrate 20, transparent members such as glass members and quartz members are used.

The element substrate 10 is bigger than the counter substrate 20, and the two boards are bonded together using a seal member 40 disposed along an outer periphery of the counter substrate 20. The liquid crystal layer 50 is configured by filling a liquid crystal having a positive or negative dielectric anisotropy in a gap between the two boards. As the seal member 40, an adhesive such as a thermosetting or ultraviolet curable epoxy resin is adopted, for example. Spacers (not illustrated) for maintaining a constant distance between the pair of boards are mixed in the seal member 40.

Inside the seal member 40, pixel region E is provided in which plural pixels P are arranged. In addition, parting portions 21 are provided surrounding the pixel region E between the seal member 40 and the pixel region E. The parting portions 21 are configured by a light-shielding metal, light-shielding metal oxide or the like, for example. Here, the pixel region E may include dummy pixels disposed to surround the plural pixels P in addition to the plural pixels P contributing to display. In addition, although not illustrated in FIGS. 1 and 2, a light-shielding portion (black matrix; BM) is provided on the counter substrate 20 which planarly divides each of the plural pixels P in the pixel region E.

A data line driving circuit 101 is provided between a first side of the element substrate 10 and the seal member 40 along the first side. In addition, an inspection circuit 103 is provided between the pixel region E and the seal member 40 along a second side opposite the first side. Further, scanning line driving circuits 102 are provided both between the pixel region E and the seal member 40 along a third side which is intersected with the first side a fourth side opposite the third side. Plural lines 105 connecting two scanning line driving circuits 102 to each other are provided between the inspection circuit 103 and the seal member 40 along the second side.

Such a data line driving circuit 101 and the plural lines connected to the scanning line driving circuits 102 are connected to external connection terminals 104 as plural connection arranged along the first side. Hereinafter, a direction along the first side is referred to as an X direction, and a direction along the third side is referred to as the Y direction. Here, the inspection circuit 103 is not limited to this disposition and may be provided between the pixel region E and the seal member 40 along the data line driving circuit 101.

As illustrated in FIG. 2, on a surface of the liquid crystal layer 50 in the first base member 10a, there are formed light-transmitting pixel electrodes 15 provided for each pixel P and thin film transistors (Thin Film Transistors, hereinafter referred to as "TFT") 30 which are switching elements, signal lines, and a first orientation film 18 which covers all of them.

In addition, a light-shielding structure which prevents switching operation from being unstable due to light which is incident on a semiconductor layer in the TFT 30 is adopted. The element substrate 10 according to the invention includes at least the pixel electrodes 15, the TFT 30, the signal lines and the first orientation film 18.

On the surface of the liquid crystal layer 50 of the counter substrate 20, there are provided the parting portions 21, a planarization layer 22 formed to cover the parting portions 21, a common electrode 23 formed to cover the planarization layer 22, and a second orientation film 24 to cover the common electrode 23. The counter substrate 20 according to the invention includes at least the parting portions 21, the common electrode 23, and a second orientation film 24.

As illustrated in FIG. 1, the parting portions 21 surround the pixel region E, and are provided in a position overlapped with the scanning line driving circuits 102 and the inspection circuit 103. As a result, light which is incident on a peripheral circuit including such driving circuits from the counter substrate 20 is shielded, and the peripheral circuit is prevented from malfunctioning due to the light. In addition, unnecessary stray light is shielded from being incident on the pixel region E, and high contrast is secured in the display of the pixel region E.

The planarization layer 22 is made of inorganic material such as oxide silicon, for example, and provided to cover the parting portions 21 with optical transparency. As a method of forming such a planarization layer 22, a film forming method using a plasma CVD method or the like for example may be exemplified.

The common electrode 23 is made of a transparent conductive film such as ITO (Indium Tin Oxide), for example, and covers the planarization layer 22. As illustrated in FIG. 1, the common electrode 23 is electrically connected to lines on the element substrate 10 side by upper and lower conductive portions 106 provided at the four corners of the counter substrate 20.

The first orientation film 18 covering the pixel electrode 15 and the second orientation film 24 covering the common electrode 23 are selected based on an optical design of the liquid crystal device 100. For example, there is an organic orientation film in which an approximately horizontal orientation process is performed with respect to liquid crystal molecules having positive dielectric anisotropy by rubbing a surface of film formed from an organic material such as polyimide, or an inorganic orientation film in which an approximately vertical orientation process is performed with respect to liquid crystal molecules having negative dielectric anisotropy by forming a film using an inorganic material such as SiOx (oxide silicon) by using a vapor deposition method. The present embodiment adopts the inorganic orientation film as the first orientation film 18 and the second orientation film 24.

Such a liquid crystal device 100 is a transmission type and adopts the optical design of a normally white mode in which the pixels P are brightly displayed during non-driving, or the optical design of a normally black mode in which the pixels P are darkly displayed during non-driving. Polarizing elements are disposed to be used according to the optical design, on the light incident side and the light exit side, respectively. The present embodiment adopts the normally black mode.

Subsequently, an electrical configuration of the liquid crystal device 100 will be described with reference to FIGS. 3 and 4. As illustrated in FIG. 3, the liquid crystal device 100 includes driving circuits such as the data line driving circuit 101, the scanning line driving circuit 102 and a sampling circuit 70, and the plural external connection terminals 104 are formed in pixel peripheral regions positioned in the periphery of the pixel region E on the first base member 10a.

Further, the liquid crystal device 100 includes data signal supply lines 114 which are connected to the plural external connection terminals 104 and supply power supply voltages (VDDX, VSSX) or driving signals (DX, CLX and the like) to the data line driving circuit 101, scan signal supply lines 121 which supply power supply voltages (VDDY, VSSY) or driving signals (DY, CLY and the like) to the scanning line driving circuit 102, and plural selector signal supply lines 114b (selector signal lines) having plural image signal lines 111 and the like which supply image signals (VID1~VID6) to data lines 6a through the sampling circuit 70.

The data line driving circuit 101 receives an X clock signal CLX (and an inverting X clock signal CLX), an X start pulse DX and the like through the external connection terminals 104 and the data signal supply lines 114 (including a start pulse signal line) from an external circuit. When the X start pulse DX is input, the data line driving circuit 101 sequentially generates selection signals S1, S2, . . . , Sn at a timing based on the X clock signal CLX (and the inverting X clock signal CLX) and then respectively outputs the selection signals to plural selection signal supplying lines 113.

The scanning line driving circuit 102 receives a Y clock signal CLY (and an inverting Y clock signal CLY), a Y start pulse DY and the like through the external connection terminals 104 and the scan signal supply lines 121 from the external circuit. The scanning line driving circuit 102 sequentially generates scan signals G1, G2, . . . , Gm and then outputs the scan signals to plural scanning lines 3a, respectively in response to such signals.

The sampling circuit 70 includes plural sampling transistors (hereinafter, referred to as S-TFT) 71 configured by a single channel type TFT of N-channel type or a complementary type TFT. Six data lines 6a adjacent to each other are connected to six S-TFTs 71, respectively, and the gates of the six S-TFTs 71 are combined to be connected to one selection signal supplying line 113. That is, each of the selection signals S1, S2, . . . , Sn output from the data line driving circuit 101 is supplied by six S-TFTs 71 being set as a single unit (sequence).

Any one of the six image signal lines 111 is connected to the sources of the six S-TFTs 71 which configure a single unit (sequence) through connection lines 112. Data lines 6a are connected to the drains of the S-TFTs 71. When the selection signals S1, S2, . . . , Sn are input, the sampling circuit 70 sequentially supplies the image signals (VID1 to VID6) to data lines 6a corresponding to the six S-TFTs 71 which configure a single unit (sequence), in response to the selection signals S1, S2, . . . , Sn.

As described above, the liquid crystal device 100 includes plural pixels P arranged in a matrix in the image region E occupying the central portion of the first base member 10a.

As illustrated in FIG. 4, each of the plural pixels P includes a pixel electrode 15, a TFT 30 for controlling to switch the pixel electrode 15, and a storage capacitor 16. The data line 6a to which the image signals (VID1 to VID6) are supplied is electrically connected to the source of the TFT 30. The scanning line 3a to which the scan signals G1, G2, . . . , Gm are supplied is connected to the gate of the TFT 30. The pixel electrode 15 and the storage capacitor 16 are connected to the drain of the TFT 30. The other electrode of the storage capacitor 16 is connected to a capacitance line 3b disposed in parallel with the scanning line 3a.

In addition, as illustrated in FIG. 3, the capacitance line 3b is drawn to the outside of the pixel region E in the X direction, and both ends of the capacitance line 3b are electrically connected to a pair of connection lines 131 extending in the Y direction between the scanning line driving circuit 102 and the pixel region E. Each of the pair of connection lines 131 is electrically connected to a pair of connection lines 132 which electrically connects the upper and lower conducting portions 106 to each other, facing each other in the X direction among the four upper and lower conducting portions 106 provided in corners of the counter substrate 20.

The pair of connection lines 132 are electrically connected to each other through the common electrode 23 of the counter substrate 20 electrically connected to the upper and lower conducting portions 106. Further, one of the pair of the connection lines 132, which is positioned to a side of the external connection terminals 104 side, is connected to a lead line 133 connected to the external connection terminals 104 receiving a common potential (LCCOM). That is, the common potential (LCCOM) is applied to the capacitance line 3b.

The selection signals S1, S2, . . . , Sn supplied to the S-TFTs 71 in which six sampling circuits 70 are set as a single unit (sequence) may be sequentially supplied in this order, and may be supplied for each sequence with respect to the S-TFTs 71 corresponding to six adjacent data lines 6a. Here, as illustrated in FIG. 3, in the present embodiment, the selection signals S1, S2, . . . , Sn are configured to be supplied for each group (sequence) with respect to a group of the six data lines 6a in response to each of the image signals (VID1 to VID6) deployed in serial-parallel and in six phases.

In relation to the number of phase deployment (that is, a sequence number of the image signals deployed in serial-parallel) of the image signals (VID1 to VID6), it is not limited to six phases, and the image signals deployed in plural phases, for example, 9 phases, 12 phases, 24 phases and the like may be configured to be supplied to the group of the data lines 6a in which the number corresponding to the deployment number is set as a single group.

The scan signals G1, G2, . . . , Gm are configured to be sequentially applied in this order to the scanning lines 3a, pulsingly with a predetermined timing from the scanning line driving circuit 102. As described above, the pixel electrodes 15 are electrically connected to the drains of the TFTs 30, the TFTs 30 are turned on only for a certain period of time by the scan signals G1, G2, ..., Gm, and the image signals (VID1 to VID6) supplied from the data lines 6a are written on the pixel electrodes 15 with a predetermined timing.

Furthermore, in order to prevent the image signals (VID1 to VID6) retained in each pixel P from being leaked, the storage capacitors 16 are added in parallel with liquid crystal capacitors formed between the image electrodes 15 and the common electrode 23.

A predetermined level of image signals (VID1 to VID6) written on the liquid crystal layer 50 (refer to FIG. 2) through the pixel electrodes 15 is retained for a certain period of time between the liquid crystal layer 50 and the common electrode 23 of the counter substrate 20. Orientation or order of molecules of the liquid crystal layer 50 vary with the applied voltage level, and then light transmitted through the liquid crystal layer 50 is modulated, and thereby enables a grayscale display.

When it is the normally white mode, transmittance with respect to incident light is decreased in response to the applied voltage applied to each unit of pixels P, thereby darkly displaying, and when it is the normally black mode, transmittance to incident light is increased in response to the applied voltage applied to each unit of pixels P, thereby brightly displaying, and as an overall display light having a contrast in response to the image signals (VID1 to VID6) is emitted from the liquid crystal device 100 and then the display is performed.

Here, the image signals (VID1 to VID6) are configured by combining potential pulses having positive polarity with potential pulses having negative polarity with respect to the common potential (LCCOM) in order to perform an AC driving for the liquid crystal layer 50. A driving method of the liquid crystal device 100 as described above is called as a phase deployment driving method. Here, the driving method of the liquid crystal device 100 is not limited to the phase deployment driving method.

As illustrated in FIG. 3, a pixel peripheral electrode 141 according to the invention is provided to surround the pixel region E in the vicinity of the connection lines 131 in the element substrate 10. The pixel peripheral electrode 141 is connected to a peripheral electrode line 142 extending in the Y direction at the end of the X direction of the element substrate 10. The pixel peripheral electrode 141 is provided on the same layer as the pixel electrode 15, for example.

The peripheral electrode line 142 is connected to a third external connection terminal 104c (a third connection terminal) disposed between first external connection terminals 104a (first connection terminals) and second external connection terminals 104b (second connection terminals) among the plural external connection terminals 104 arranged in the X direction. Detailed arrangement of the pixel peripheral electrode 141 in the element substrate 10 will be described in an exemplary embodiment later.

Then, a structure of a pixel P in the liquid crystal device 100 is described in particular the specific line structure of the element substrate 10 and the orientation state of the liquid crystal molecules will be described with reference to FIG. 5.

As illustrated in FIG. 5, firstly, the scanning line 3a is formed on the first base member 10a. For the scanning line 3a, for example, metal simple substance, alloy, metal silicide, poly silicide and nitride, all of which include at least one of the metals, such as Al (aluminum), Ti (titanium), Cr (chromium), W (tungsten), Ta (tantalum), Mo (molybdenum) and the like, alternatively the one on which these are laminated may be used. The scanning line 3a has light shielding properties.

A first insulation film (base insulation film) 11a made of oxide silicon or the like, for example, is formed so as to cover the scanning line 3a, and a semiconductor layer 30a is formed on the first insulation film 11a in an island shape. For example, the semiconductor layer 30a is made of polycrystalline silicon film, impurity ions are injected, and there is formed a LDD structure having a first source/drain region, a junction region, a channel region, a junction region and a second source/drain region.

A second insulation film (a gate insulation film) 11b is formed so as to cover the semiconductor layer 30a. Furthermore, a gate electrode 30g is formed at a position opposite the channel region across the second insulation film 11b.

A third insulation film 11c is formed so as to cover the gate electrode 30g and the second insulation film 11b, and two contact holes CNT1 and CNT2 penetrating through the second insulation film 11b and the third insulation film 11c are formed at the positions overlapped with the respective end portions of the semiconductor layer 30a.

Then, in order to fill the two contact holes CNT1 and CNT2 and cover the third insulation film 11c, there is formed a conductive film by using a light-shielding conduction material such as Al (aluminum) or alloy thereof, which are patterned, and thereby a source electrode 31 and the data line 6a which are connected to the first source/drain region through the contact hole CNT1 are formed. At the same time, a drain electrode 32 (a first relay electrode 6b) connected to the second source/drain region through the contact hole CNT2 is formed.

Then, a first interlayer insulation film 12 is formed by covering the data line 6a, the first relay electrode 6b and the third insulation film 11c. The first interlayer insulation film 12 is made of silicon oxides or silicon nitrides, for example, and there is performed a planarization process to flatten the surface unevenness caused by covering the region in which the TFTs 30 are provided. Examples of the planarization processing method include a chemical mechanical polishing process (Chemical Mechanical Polishing: CMP process), a spin coat process or the like.

There is formed a contact hole CNT3 which penetrates through the first interlayer insulation film 12 at the position overlapped with the first relay electrode 6b. There is formed a conductive film made of light-shielding metal such as Al (aluminum) or alloy thereof, for example, so as to coat the contact hole CNT3 and cover the first interlayer insulation film 12, which are patterned, and thereby there are formed a line 7a, and a second relay electrode 7b electrically connected to the first relay electrode 6b through the contact hole CNT3.

The line 7a is formed so as to be planarly overlapped with the semiconductor layer 30a of the TFTs 30 or the data line 6a, and functions as a shield layer by receiving a fixing potential.

A second interlayer insulation film 13a is formed so as to cover the line 7a and the second relay electrode 7b. The second interlayer insulation film 13 also can be formed by using the silicon oxides, the silicon nitrides or oxynitride, for example, and the planarization process such as the CMP process is performed.

A contact hole CNT4 is formed at the position overlapped with the second relay electrode 7b in the second interlayer insulation film 13a. There is formed a conductive film made of the light-shielding metal such as Al (aluminum) or an alloy thereof, for example, so as to coat the contact hole CNT4 and cover the second interlayer insulation film 13a, these are patterned, and thereby first capacitance electrodes 16a and third relay electrodes 16d are formed.

An insulation film 13b is patterned and formed so as to cover the outer edge of the portion opposite a second capacitance electrode 16c through a dielectric layer 16b formed later among the first capacitance electrodes 16a. In addition, the insulation film 13b is patterned and formed so as to cover the outer edge excluding the portion overlapped with a contact hole CNT5 among the third relay electrodes 16d.

The dielectric layer 16b is formed by covering the insulation film 13b and the first capacitance electrode 16a. As the dielectric layer 16b, there may be used a single layer film such as silicon nitrides, hafnium oxide ($HfO_2$), alumina ($Al_2O_3$) or tantalum oxide ($Ta_2O_5$), or multi-layer films stacked by at least the two kinds of single layer films among the single layer films. The dielectric layer 16b in the portion planarly overlapped with the third relay electrodes 16d is removed by etching or the like.

So as to cover the dielectric layer 16b, the conductive film, for example, TiN (Titanium nitride) or the like is formed, and there is formed the second capacitance electrode 16c which is connected to the third relay electrodes 16d and disposed opposite the first capacitance electrode 16a by patterning the conduction film. The storage capacitor 16 is configured by the dielectric layer 16b, the first capacitance electrode 16a which are, pinching the electric layer 16b, disposed opposite each other and the second capacitance electrode 16c.

Then, there is formed a third interlayer insulation film 14 which covers the second capacitance electrode 16c and the dielectric layer 16b. The third interlayer insulation film 14 is also made of the silicon oxides or the silicon nitrides, for example, and the planarization process such as the CMP process is performed with respect to the third interlayer insulation film 14. There is formed a contact hole CNT5 penetrating through the third interlayer insulation film 14 so that the second capacitance electrode 16c may reach the portion in contact with the third relay electrode 16d.

There is formed a transparent conductive film (an electrode film) such as ITO is formed so as to coat the contact hole CNT5 and cover the third interlayer insulation film 14. The transparent conductive film (an electrode film) is patterned, and thereby there is formed a pixel electrode 15 which is electrically connected to the second capacitance electrode 16c and the third relay electrode 16d through the contact hole CNT5.

The second capacitance electrode 16c is electrically connected to the drain electrode 32 of the TFT 30 through the third relay electrode 16d, the contact hole CNT4, the second relay electrode 7b, the contact hole CNT3 and the first relay electrode 6b, and electrically connected to the pixel electrode 15 through the contact hole CNT5.

The first capacitance electrode 16a is formed across plural pixels P, and functions as a capacitance line 3b of an equivalent circuit (refer to FIG. 4). As a result, the potential which is supplied to the pixel electrode 15 through the drain electrode 32 of the TFT 30 can be retained between the first capacitance electrode 16a and the second capacitance electrode 16c.

In this manner, multiple wiring layers are formed on the first base member 10a, and the multiple wiring layers are represented using numerals of the insulation film or the interlayer insulation film which insulates between the multiple wiring layers. That is, the first insulation film 11a, the second insulation film 11b and the third insulation film 11c are collectively referred to as the wiring layer 11. A representative line of the wiring layer 11 is a gate electrode 30g. A representative line of the first interlayer insulation film 12 is a data line 6a. The second interlayer insulation film 13a, the insulation film 13b and dielectric layer 16b are collectively referred to as a wiring layer 13, and a representative line thereof is a line 7a. Similarly, a representative line of the third interlayer insulation film 14 is the first capacitance electrode 16a (a capacitance line 3b).

The first orientation film 18 is formed so as to cover the pixel electrode 15 of the element substrate 10, and the second orientation film 24 is formed so as to cover the common electrode 23 of the counter substrate 20 disposed opposite the element substrate 10 through the liquid crystal layer 50. As described above, the orientation films 18 and 24 are inorganic orientation films, and formed of an aggregate of columns 18a and 24a which inorganic material such as oxide silicon is grown in a columnar shape, for example by being obliquely deposited from a predetermined direction. Liquid crystal molecules LC having negative dielectric anisotropy with respect to such orientation films 18 and 24 are substantially vertically oriented with a pre-tilted angle of three to five degrees in a tilting direction of the columns 18a and 24a with respect to the normal direction of the orientation film surface. The liquid crystal molecules LC are operated (vibrate) so as to be inclined in the electric field direction generated between the pixel electrode 15 and the common electrode 23 by applying an AC potential to between the pixel electrode 15 and the common electrode 23 to drive the liquid crystal layer 50.

Figure 6:
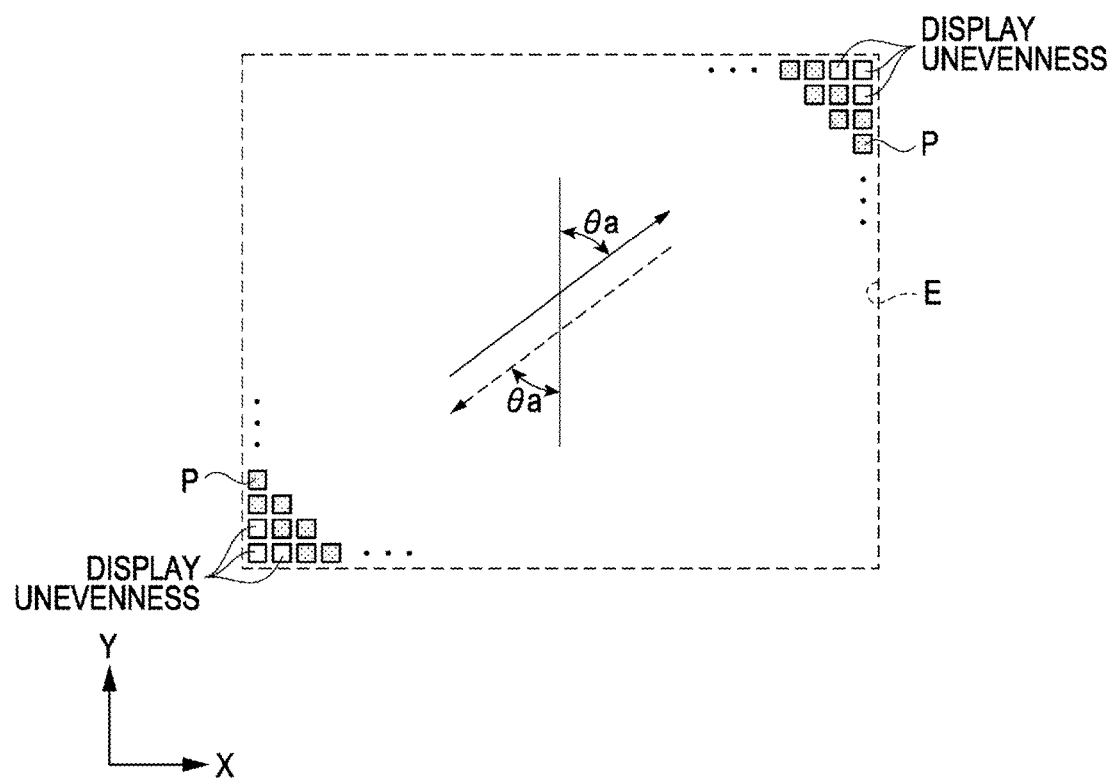
FIG. 6 is a schematic plan view illustrating a relation between an oblique deposition direction of an inorganic material and a display defect due to an ionic impurity.

FIG. 6 is a schematic plan view illustrating the relation between the oblique deposition direction of the inorganic material and display defects due to an ionic impurity.

As illustrated in FIG. 6, the oblique deposition direction of the inorganic material when forming the columns 18a and 24a (refer to FIG. 5) is the direction that intersected with the Y direction at a predetermined azimuth angle θa from the lower left towards the upper right as illustrated by the arrow with a dashed line in the element substrate 10 side. In the counter substrate 20 side disposed to be opposite the element substrate 10, it is the direction that is intersected with the Y direction at a predetermined azimuth right as illustrated by an arrow of a solid line. The predetermined angle θa is forty five degrees, for example. Here, the oblique deposition direction illustrated in FIG. 6 is the direction when the liquid crystal device 100 is viewed from the counter substrate 20 side.

The liquid crystal molecules LC are operated (vibrate), by driving the liquid crystal layer 50, and the liquid crystal molecules LC come to flow in the oblique deposition direction illustrated by the arrow of the dashed line or the solid line in FIG. 6, in the vicinity of the interface between the liquid crystal layer 50 and the orientation films 18 and 24. If negative ionic impurity or positive ionic impurity is included in the liquid crystal layer 50, the ionic impurity may be adversely and unevenly distributed by being induced towards corner portions of the pixel region E along the flow of the liquid crystal molecules LC. If insulation resistance of the liquid crystal layer 50 is decreased in the pixel P positioned in the corner portions because of the uneven distribution of the ionic impurity, it causes a decline in the driving potential in the pixel P, and display unevenness (blotches) as illustrated in FIG. 6 or a burn-in phenomenon due to an electrical conduction becomes noticeable.

In the liquid crystal device 100 according to the present embodiment, a DC current is applied to a pixel peripheral electrode 141 on the element substrate 10 illustrated in FIG.

3, and improves the uneven distribution of the negative or positive ionic impurity causing the display unevenness or the burn-in phenomenon to occur is improved.

As described above, the element substrate 10 includes the multiple wiring layers, and there are various lines receiving a predetermined potential in the pixel periphery region between the seal member 40 and the pixel region E. In order that the pixel peripheral electrode 141 function fully, it is necessary for the pixel peripheral electrode 141 to receive little influence on other line potential, and to be adequately disposed in relation to other lines. Hereinafter, a line structure of the element substrate 10 according to the present embodiment will be described.

Figure 7:
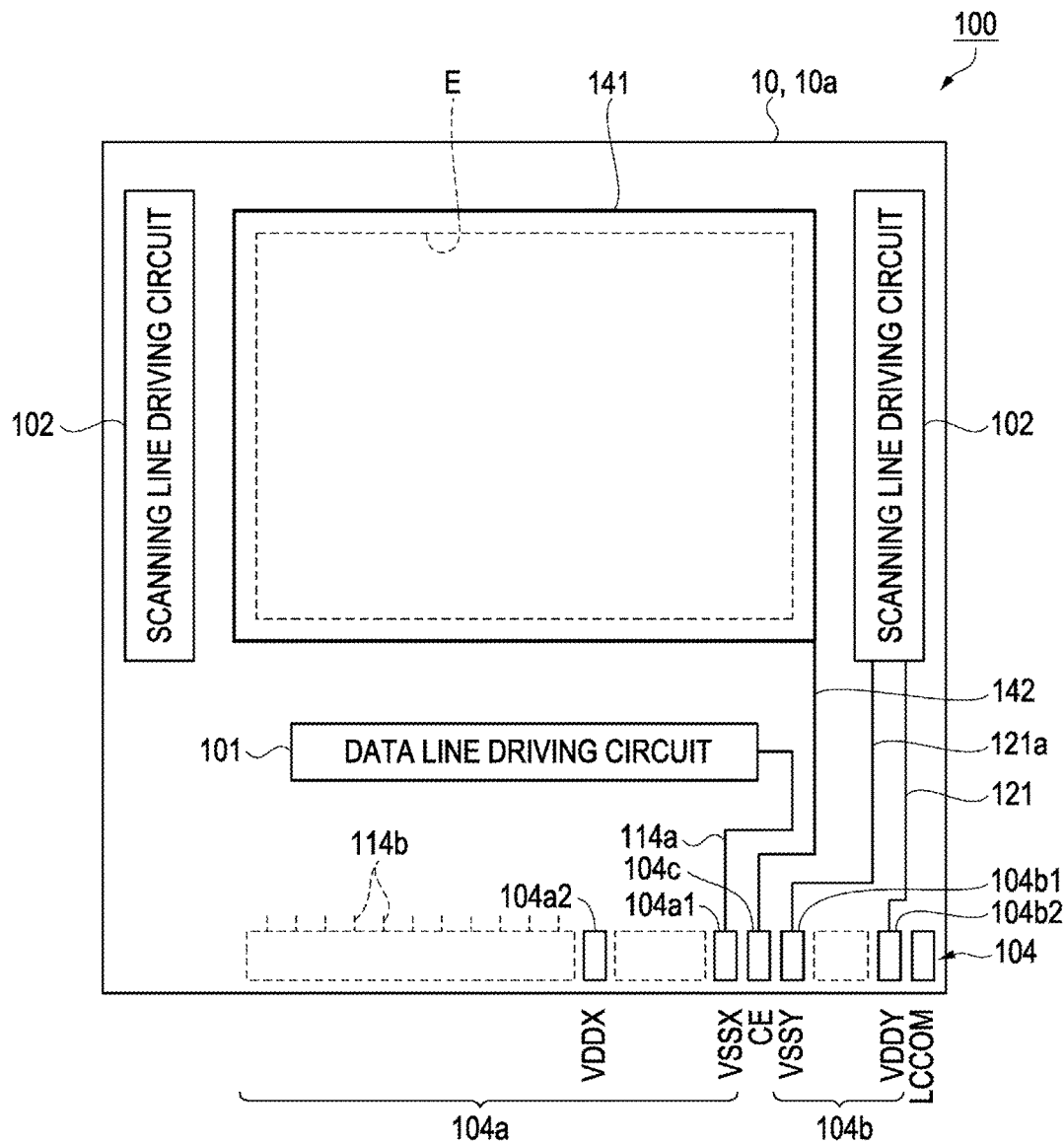
FIG. 7 is a schematic plan view illustrating a structure of the liquid crystal device having elements relating to the pixel peripheral electrode.

FIG. 7 is a schematic plan view illustrating a structure of the liquid crystal device having the pixel peripheral electrode, the peripheral electrode lines and the external connection terminals. Hereinafter, the structure of the liquid crystal device including elements relating to the pixel peripheral electrode will be described with reference to FIG. 7.

As illustrated in FIG. 7, the liquid crystal device 100 according to the present embodiment includes the data line driving circuit 101 along a first side of the element substrate 10, as described above. In addition, there are provided the scanning line driving circuits 102 along a third side and a fourth side which are orthogonal to (intersecting) the first side. In addition, there are provided the plural external connection terminals 104 between the first side and the data line driving circuit 101.

The pixel peripheral electrode 141 are continuously provided (connected) to each other so as to surround the pixel region E in the periphery of the pixel region E. The pixel peripheral electrode 141 is connected to the peripheral electrode line 142 extending in the Y direction of the element substrate 10.

As described above, the pixel peripheral electrode 141 is provided in the periphery of the pixel region E. Then, the peripheral electrode line 142 is extended to the portion as close as possible to the pixel region E in the pixel peripheral electrode 141. Specifically, for example, the pixel peripheral electrode 141 made of ITO is electrically connected to the peripheral electrode line 142 made of aluminum having lower resistance than ITO, and thereby low resistance can be obtained.

The peripheral electrode line 142 is electrically connected to a third external connection terminal 104c (CE) among the plural external connection terminals 104 arranged in the X direction. The third external connection terminal 104c (CE) is disposed between an external connection terminal 104a1 which a reference potential (VSSX) is applied and which is one of the first external connection terminals 104a, and an external connection terminal 104b1 to which a reference potential (VSSY) is applied to and which is one of the second external connection terminals 104b.

A power supply voltage of a low potential, for example, 0 volt (GND) is applied to the external connection terminals 104a1 and the external connection terminals 104b1. Here, a power supply voltage of a high potential, for example, 15.5 volt is applied to the external connection terminals 104a2 to which the driving potential (VDDX) is applied, and the external connection terminals 104b2 to which the driving potential (VDDY) is applied. The common potential (LC-COM) which is applied to the capacitance line 3b or the common electrode 23 of the counter substrate 20 is a potential between the power supply voltage of the low potential and the power supply voltage of the high potential, for example, the common potential is 6 volt.

Specifically, the external connection terminal 104a1 to which the reference potential (VSSX) is applied is electrically connected to the data line driving circuit 101 through a data signal supply line 114a which is one of the data signal supply lines 114. In addition, the external connection terminal 104b1 to which the reference potential (VSSY) is applied is electrically connected to the scanning line driving circuit 102 through a scan signal supply line 121a which is one of the scan signal supply lines 121.

The peripheral electrode line 142 is disposed so as not to planarly intersect with the data signal supply line 114a and the scan signal supply line 121a which are adjacent to each other. In other words, the peripheral electrode line 142 is disposed so as not to planarly intersect with the plural data signal supply lines 114 (including 114a and 114b) connected to the external connection terminals 104, or the plural scan signal supply line 121 (including 121a).

In this way, the peripheral electrode line 142 connected to the pixel peripheral electrode 141 is connected to the third external connection terminal 104c disposed between the external connection terminal 104a1 and the external connection terminal 104b1 so as not to planarly intersect with the data signal supply lines 114a connected to the external connection terminals 104a1 to which the reference potential (VSSX) is applied, or the scan signal supply line 121a connected to the external connection terminals 104b1 to which the reference potential (VSSY) is applied, and thereby electrostatic breakdown can be prevented from occurring in the region where the lines are planarly intersected with each other.

In addition, a long pulse signal rather than a short pulse signal is undesirable as noise since the long pulse signal easily changes the potential of the intersected lines. Specifically, the signal supplied to the scan signal supply line 121 has a longer period than those of the signals supplied to the data signal supply lines 114 since it is undesirable as noise. Accordingly, the noise of the scan signal supply line 121 connected to the scanning line driving circuit 102 is required not to affect the peripheral electrode lines 142. In addition, the long pulse signal has a tendency to show remarkable variations in the voltage difference compared with the short pulse signal. Accordingly, it is preferable that the peripheral electrode line 142 does not planarly intersect with the scan signal supply line 121. In addition, in the data signal supply lines 114, it is preferable that the peripheral electrode line 142 does not intersect with a line which supplies start pulse (DX) having a slow signal period.

Accordingly, it is preferable that the peripheral electrode line 142 be disposed so as not to intersect the lines 114b and 121 between the scan signal supply line 121 and the data signal supply lines 114b (pulse signal lines) to which at least the start pulse is supplied.

Electronic Apparatus

Figure 8:
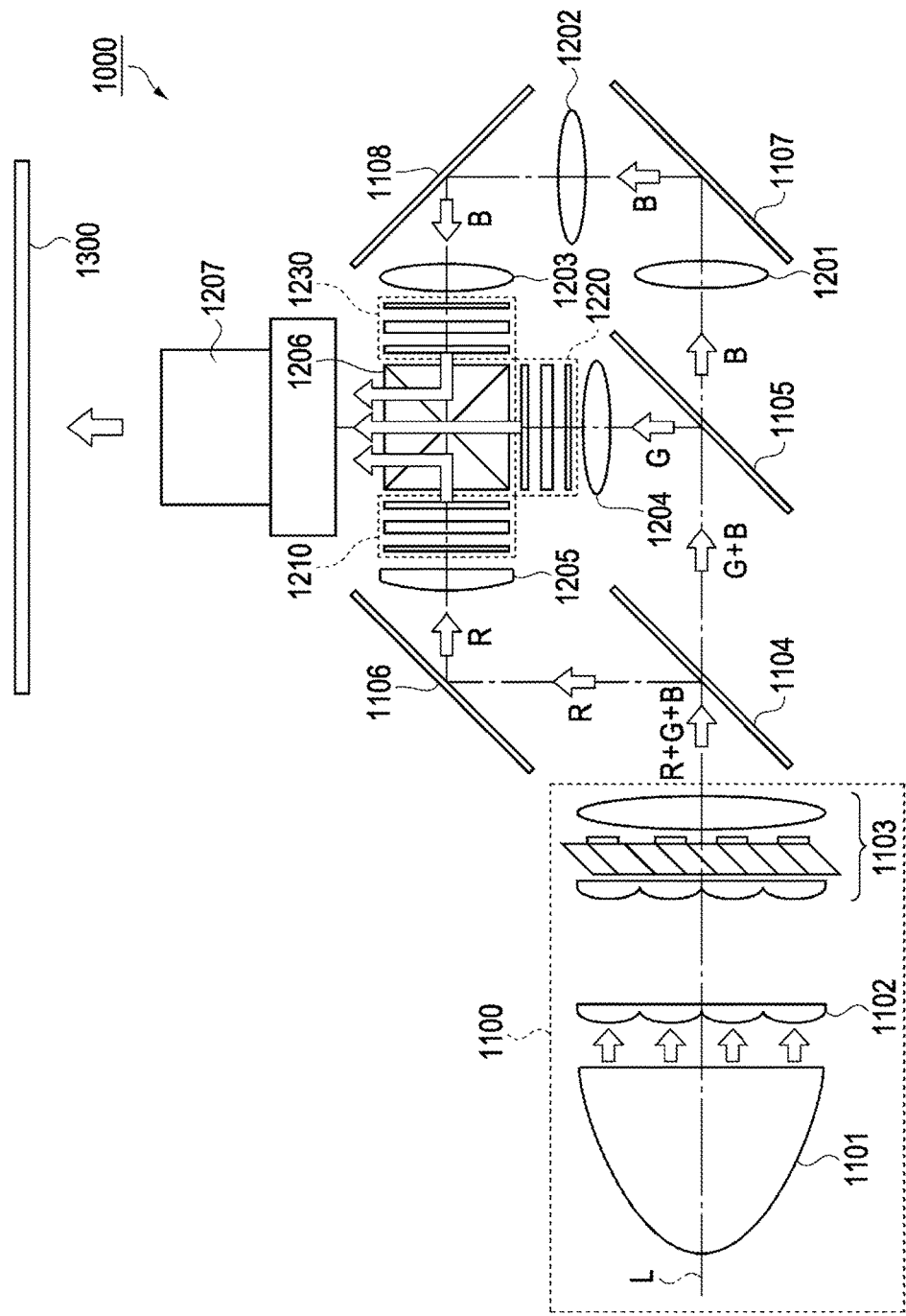
FIG. 8 is a schematic diagram illustrating a structure of a projection type display device having the liquid crystal device.

Then, a projection type display device as an electronic apparatus according to the present embodiment will be described with reference to FIG. 8. FIG. 8 is a schematic diagram illustrating the structure of the projection type display device including in the above-described liquid crystal device.

As illustrated in FIG. 8, the projection type display device 1000 as the electronic apparatus according to the present embodiment includes a polarization illumination device 1100 disposed along a system optical axis L, two dichroic mirrors 1104 and 1105 as light separation elements, three reflection mirrors 1106, 1107 and 1108, five relay lenses 1201, 1202, 1203, 1204 and 1205, three transmission liquid crystal light valves 1210, 1220 and 1230 as optical modulation means, a cross dichroic prism 1206 as a photosynthesis element, and a projection lens 1207.

The polarization illumination device 1100 is schematically configured by a lamp unit 1101 as a light source formed of a white light source such as an ultrahigh pressure mercury lamp or a halogen lamp, an integrator lens 1102, and a polarization conversion element 1103.

The dichroic mirror 1104 transmits green light (G) and blue light (B) by reflecting red light (R) among polarization bundle of rays emitted from the polarization illumination device 1100. The other dichroic mirror 1105 transmits the blue light (B) by reflecting the green light (G) which transmits the dichroic mirror 1104.

The red light (R) reflected from the dichroic mirror 1104 is incident on the liquid crystal light valve 1210 via the relay lens 1205 after being reflected from the reflection mirror 1106. The green light (G) reflected from the dichroic mirror 1105 is incident on the liquid crystal light valve 1220 via the relay lens 1204. The blue light (B) penetrating through the dichroic mirror 1105 is incident on the liquid crystal light valve 1230 via a light guide system configured by three relay lenses 1201 to 1203, and two reflection mirrors 1107 and 1108.

The liquid crystal light valves 1210, 1220 and 1230 are disposed to be opposite an incident surface of each color light of the cross dichroic prism 1206. The color light which is incident on the liquid crystal light valves 1210 to 1230 is modulated based on image information (an image signal) and emitted towards the cross dichroic prism 1206.

As to this prism, four rectangular prisms are bonded together, and a dielectric multilayer film which reflects red light inward and another dielectric multilayer film which reflects blue light inward are formed in a cross shape. Three color lights are composed by these dielectric multilayer films and thus light to display color images are composed. The composed light is projected on a screen 1300 by the projection lens 1207 which is a projection optical system, and then images are displayed by being enlarged.

The above-described liquid crystal device 100 is applied to the liquid crystal light valve 1210. The liquid crystal device 100 is disposed in a gap between a pair of polarization elements disposed using a crossed Nicol prism in the incident side and emission side of the color light. The same applies to other liquid crystal valves 1220 and 1230.

According to such a projection type display device 1000, since the liquid crystal device 100 in which the display unevenness, the burn-in phenomenon or the like caused by the ionic impurity is decreased is used as the liquid crystal light valves 1210, 1220 and 1230, good-looking display quality and high reliability are realized.

As described above, according to the liquid crystal device 100 and the electronic apparatus of the first embodiment, the following effect can be obtained.

(1) According to the liquid crystal device 100 of the first embodiment, since the third external connection terminal 104c which is electrically connected to the peripheral electrode line 142 is disposed between the first external connection terminal 104a which is electrically connected to the data signal supply line 114, and the second external connection terminal 104b which is electrically connected to the scan signal supply line 121, it is possible to prevent the data signal supply line 114 and the scan signal supply line 121 from being planarly intersected with the peripheral electrode line 142, and the electrostatic breakdown generated between the lines when being intersected can be prevented from occurring. In addition, it is possible to suppress blotches from occurring in the pixel region E by applying an adequate voltage to the pixel peripheral electrode 141.

(2) According to the liquid crystal device 100 of the first embodiment, it is possible to suppress noise from being added to the peripheral electrode line 142, by disposing the peripheral electrode line 142 so as not to be intersected at least the pulse signal line (in particular, the start pulse signal line). Specifically, the line (the start pulse signal line) to which a low frequency signal to which noise is easily added and a large amplitude signal is supplied, and the peripheral electrode line 142 are disposed so as not to intersect each other. As a result, the pixel peripheral electrode 141 can be operated with an adequate voltage.

(3) According to the liquid crystal device 100 of the first embodiment, since the pixel peripheral electrode 141 is disposed to be connected so as to surround the pixel region E, the blotches can be suppressed from occurring regardless of the position inside the pixel region E. In other words, at least four corners of the pixel region E can be protected from the blotches.

(4) According to the liquid crystal device 100 of the first embodiment, for example, since the pixel peripheral electrode 141 is formed from the same material as the pixel electrodes 15 configured by ITO, the liquid crystal device 100 can be manufactured without newly increasing the manufacturing process.

(5) According to the liquid crystal device 100 of the first embodiment, since the peripheral electrode line 142 using aluminum with lower resistance than ITO is extended to the portion close to the pixel region E and thus the peripheral electrode line 142 is electrically connected to the pixel peripheral electrode 141 configured by ITO, the peripheral electrode line 142 and the pixel peripheral electrode 141 can be connected to each other by relatively low resistance.

(6) According to the electronic apparatus of the present embodiment, since the above-described liquid crystal device 100 is provided, the electrostatic breakdown and defective display caused by noise can be suppressed, and an electronic apparatus in which display quality is able to be improved can be provided.

Second Embodiment

Liquid Crystal Device

Figure 9:
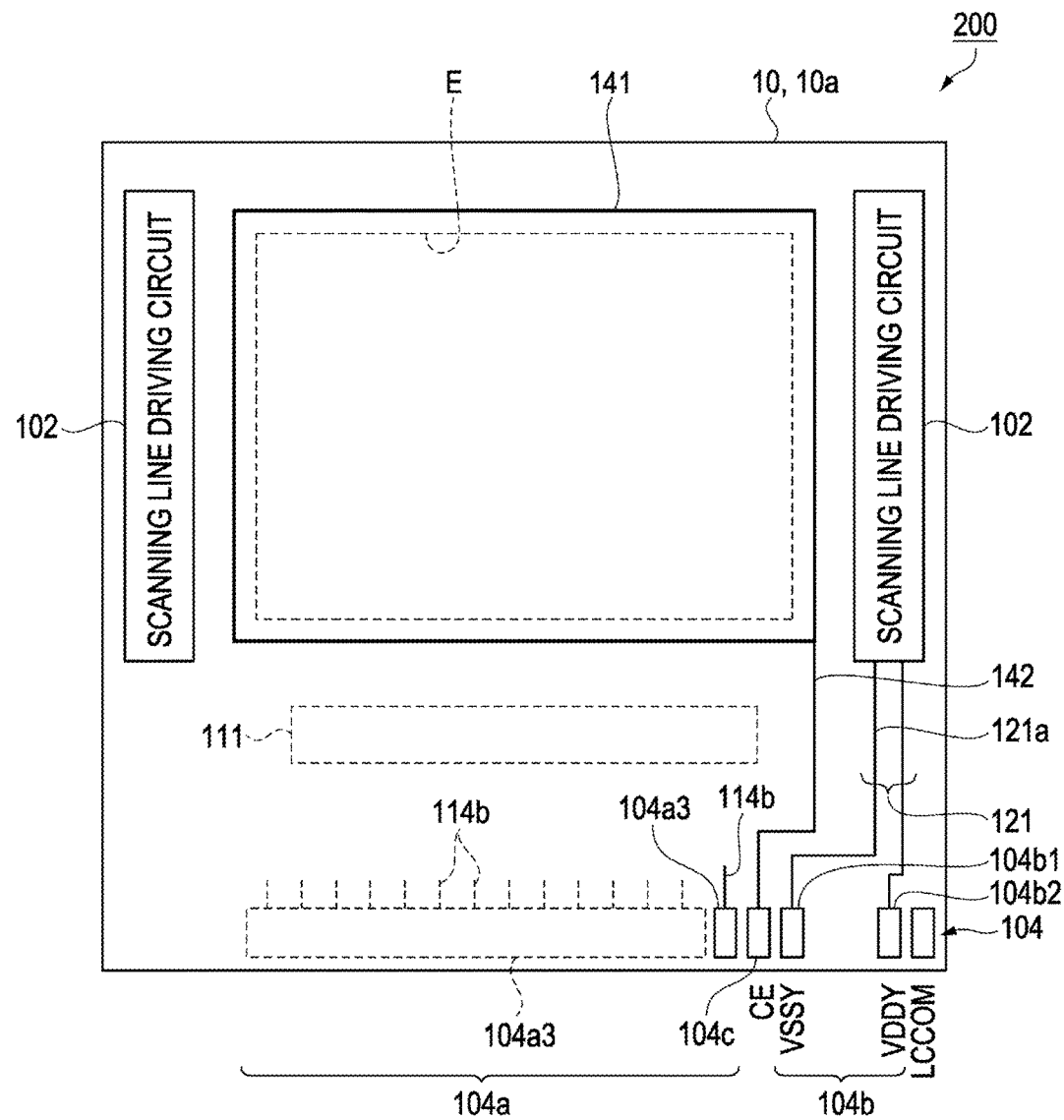
FIG. 9 is a schematic plan view illustrating a structure of a liquid crystal device according to a second embodiment.

FIG. 9 is a schematic plan view illustrating a structure of a liquid crystal device according to a second embodiment. Hereinafter, the structure of the liquid crystal device according to the second embodiment will be described with reference to FIG. 9.

The liquid crystal device 200 according to the second embodiment is different in a portion where the data line driving circuit 101 is not embedded (for example, the data line driving circuit 101 is externally attached to a flexible line board connected to the external connection terminals), compared with the liquid crystal device 100 according to the first embodiment described above, and the other configurations are substantially the same. For this reason, the second embodiment will be described in detail for the portions different from the first embodiment, and other repeated descriptions thereof will be properly omitted.

As illustrated in FIG. 9, the liquid crystal device 200 according to the second embodiment includes the plural external connection terminals 104 along the first side of the element substrate 10. In addition, there are provided the scanning line driving circuits 102 along the third side and the fourth side that are opposite each other and orthogonal to the first side.

Similarly to the first embodiment, the pixel peripheral electrode 141 is provided around the pixel region E so as to surround the periphery of the pixel region E. The pixel peripheral electrode 141 is connected to the peripheral electrode line 142 extending in the Y direction of the element substrate 10.

The peripheral electrode line 142 is electrically connected to the third external connection terminal 104c disposed between a selector signal external connection terminal 104a3 which is a portion of the first external connection terminals 104a, and the external connection terminal 104b1 which is a portion of the second external connection terminals 104b, among the plural external connection terminals that are arranged in the X direction.

The selector signal external connection terminal 104a3 is electrically connected to image signal lines 111 through a selector signal supply line 114 which is one of the data line lines 114. Here, in the present embodiment, the "data signal supply lines 114" described in the first embodiment is described as "data line lines 114". The external connection terminal 104b1 is electrically connected to the scanning line driving circuit 102 through the scan signal supply line 121a.

The peripheral electrode line 142 is disposed so as not to planarly intersect with the selector signal supply line 114b and the scan signal supply line 121a which are adjacent to each other. In other words, the peripheral electrode line 142 is disposed so as not to planarly intersect with the plural selector signal supply lines 114b connected to the external connection terminals 104, and the plural scan signal supply lines 121.

In this way, since the peripheral electrode line 142 is connected to the third external connection terminal 104c which is disposed between the selector signal external connection terminal 104a3 and the external connection terminal 104b1, so that the peripheral electrode line 142 connected to the pixel peripheral electrode 141 may not planarly intersect with the selector signal supply line 114b connected to the selector signal external connection terminal 104a3, and the scan signal supply line 121a connected to the external connection terminal 104b1, the electrostatic breakdown occurred in a case where the lines are planarly intersected with each other can be suppressed.

In other words, it is preferable that the peripheral electrode line 142 be disposed so as not to planarly overlap with the selector signal supply lines 114b and the scan signal supply line 121 between at least the selector signal supply lines 114b among the data line lines 114 and the scan signal supply line 121.

As described above, according to the liquid crystal device 200 of the second embodiment, in addition to the above-described effects (1) to (6), the following effects can be obtained.

(7) According to the liquid crystal device 200 of the second embodiment, the above structure can also be applied to the liquid crystal device 200 in which the data line driving circuit 101 is externally attached to the flexible line board connected to the external connection terminals.

(8) According to the liquid crystal device 200 of the second embodiment, since the peripheral electrode line 142 is disposed so as not to planarly overlap with at least the selector signal supply lines 114b, noise can be suppressed from being carried on the peripheral electrode line 142, which is caused by being intersected with the selector signal supply line 114b with a large frequency amplitude.

Third Embodiment

Liquid Crystal Device

Figure 10:
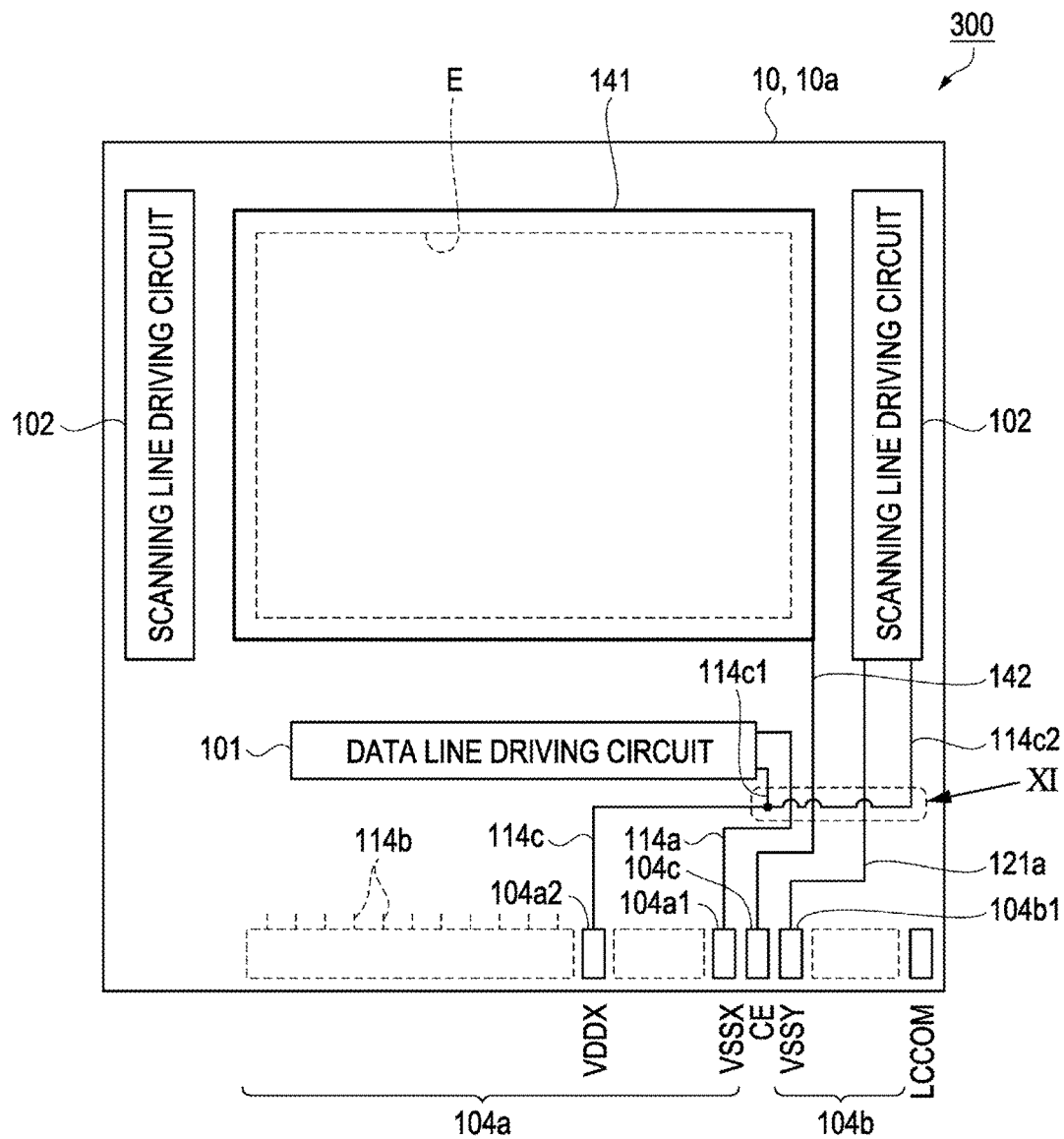
FIG. 10 is a schematic plan view illustrating a structure of a liquid crystal device according to a third embodiment.
Figure 11:
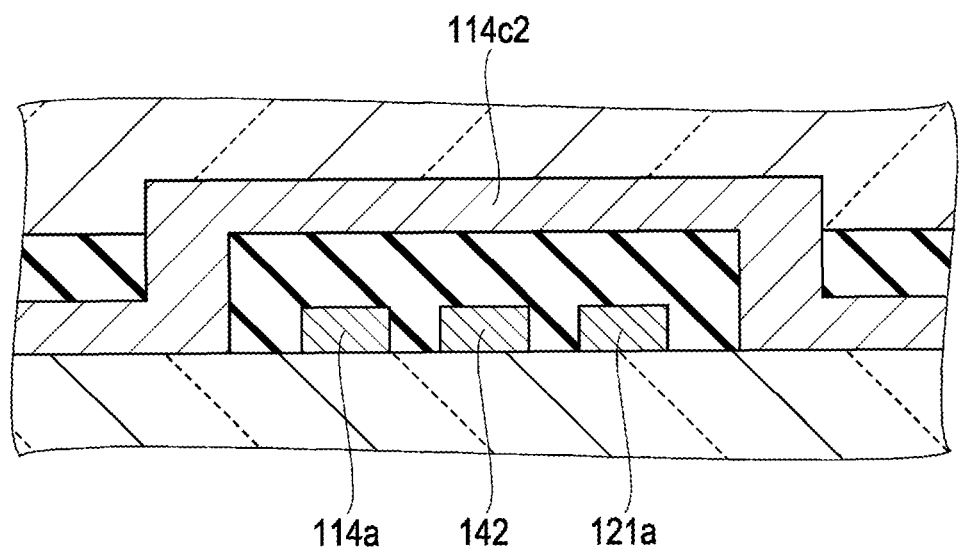
FIG. 11 is an enlarged cross-sectional view illustrating an enlarged XI portion of the liquid crystal device in FIG. 10.

FIG. 10 is a schematic plan view illustrating a structure of a liquid crystal device according to a third embodiment. FIG. 11 is an enlarged cross-sectional view illustrating an enlarged XI portion of the liquid crystal device in FIG. 10. Hereinafter, the structure of the liquid crystal device according to the third embodiment will be described with reference to FIGS. 10 and 11.

The liquid crystal device 300 according to the third embodiment is different in a portion where the data line driving circuit 101 and the scanning line driving circuit 102 are used by being distributed from a single power supply, compared with the liquid crystal device 100 according to the first embodiment described above, and the other configurations are substantially the same. For this reason, the third embodiment will be described in detail for the portions different from the first embodiment, and other repeated descriptions thereof will be properly omitted.

As illustrated in FIG. 10, the liquid crystal device 300 according to the third embodiment is the same as the first embodiment, and includes the data line driving circuit 101, scanning line driving circuit 102 and the plural external connection terminals 104 which are formed in the periphery region positioned in the periphery of the pixel region E on the first base member 10a.

Similarly to the first embodiment, the pixel peripheral electrode 141 is provided in the periphery of the pixel region E so as to surround the pixel region E. The pixel peripheral electrode 141 is connected to the peripheral electrode line 142 extending in the Y direction of the element substrate 10.

The peripheral electrode line 142, similarly to the first embodiment, is electrically connected to the third external connection terminal 104c which is disposed between the external connection terminal 104a1 which is one of the first external connection terminals 104a, and the external connection terminal 104b1 which is one of the second external connection terminals 104a, among the plural external connection terminals 104 disposed in the X direction, and.

Specifically, the external connection terminal 104a1 is electrically connected to the data line driving circuit 101 through the data signal supply line 114a which is one of the data signal supply lines 114. In addition, the external connection terminal 104b1 is electrically connected to the scanning line driving circuit 102 through the scan signal supply line 121a which is one of the scan signal supply lines 121.

The peripheral electrode line 142 is disposed so as not to planarly intersect with the data signal supply line 114a and the scan signal supply line 121a that are adjacent to each other. In other words, the peripheral electrode line 142 is disposed so as not to planarly intersect with the plural data signal supply lines 114 connected to the external connection terminals 104, and the plural scan signal supply lines 121.

In addition, the data signal supply line 114c connected to the external connection terminal 104a2 to which the driving potential (VDDX) is applied is distributed to two of the data line driving circuit 101 and the scanning line driving circuits 102, one side of a first branch line 114c1 which is distributed is connected to the data line driving circuit 101, and the other side of a second branch line 114c2 is connected to the scanning line driving circuit 102.

At this time, as illustrated in FIG. 10, the second branch line 114c2 is disposed so as to planarly intersect with the data signal supply line 114a, the peripheral electrode line 142 and the scan signal supply line 121a. Specifically, as illustrated in FIG. 11, the second branch line 114c2 is disposed to cross over (in a bridge shape) the data signal supply line 114a, the peripheral electrode line 142 and the scan signal supply line 121a through the insulation film so as not to be electrically connected thereto.

For example, the data signal supply line 114a, the peripheral electrode line 142 and the scan signal supply line 121a are provided on the same layer as the data lines 6a. In addition, for example, the second branch line 114c2 is provided on the same layer as the data lines 6a and the line 7a.

Specifically, the data signal supply line 114a, the scan signal supply line 121a and the data signal supply line 114c are formed of the metal lines of two layers, the data lines 6a and the line 7a. The peripheral electrode line 142 is formed of the metal line of the same layer as the data lines 6a.

For the data signal supply line 114c, the metal line of the same layer as the line 7a is used in the portion where the data signal supply line 114a, the peripheral electrode line 142 and the scan signal supply line 121a and the like are intersected with one another. That is, for the data signal supply line 114a, the scan signal supply line 121a and the data signal supply line 114c, metal lines of a single layer are used in the intersecting portion. In addition, the data signal supply line 114c is formed to have a large line width in the intersecting portion.

In this manner, the peripheral electrode line 142 connected to the pixel peripheral electrode 141 is disposed to planarly intersect with the second branch line 114c2 which is one of the power supply lines. Since the peripheral electrode line 142 is not disposed to planarly intersect with the selector signal supply lines 114b, noise can be suppressed from being added to the peripheral electrode line 142.

Specifically, the peripheral electrode line 142 is disposed so as not to planarly intersect with the line to which the low frequency signal such as the start pulse (DX: refer to FIG. 3) or the large amplitude signal is supplied. Accordingly, the pixel peripheral electrode 141 can be operated by a normal voltage. In other words, the peripheral electrode line 142 may intersect the power supply line to which noise is hardly added. As a result, the blotches can be suppressed from occurring in the pixel region E.

As described above, according to the liquid crystal device 300 of the third embodiment, the effects described below can be obtained in addition to the above-described effects (1) to (6).

(9) According to the liquid crystal device 300 of the third embodiment, the data signal supply line 114c and the peripheral electrode line 142 are disposed to planarly intersect with each other, but noise is not easily carried on the peripheral electrode line 142, compared with the selector signal supply line 114b. Accordingly, the data line driving circuit 101 and the scanning line driving circuit 102 can be driven using the single power supply, by dividing the data signal supply line 114 into the first branch line 114c1 and the second branch line 114c2. Specifically, since the peripheral electrode line 142 is disposed so as not to planarly overlap with at least the selector signal supply line 114b, noise can be suppressed from being carried on the peripheral electrode line 142, which is caused by intersecting with the selector signal supply line 114b which has a large frequency amplitude.

(10) According to the liquid crystal device 300 of the third embodiment, since the third external connection terminal 104c electrically connected to the peripheral electrode line 142 is disposed between the first external connection terminal 104a and the second external connection terminal 104b, the number of the lines being planarly intersected with the peripheral electrode line 142 can be reduced compared with the number in the related art. Accordingly, a risk resulting from the electrostatic breakdown between the lines can be suppressed at a minimum level.

Here, the aspects of the invention are not limited to the above-described embodiments, can be appropriately changed within the scope which is not contrary to the gist or spirit of the invention readable from the aspects and throughout the specification, and can be included in the technical scope of the aspects of the invention. In addition, the invention can be embodied with the following aspects.

Modification Example 1

As described above, the pixel peripheral electrode 141 is not limited to be continuously (to be connected) provided so as to surround the pixel region E, and for example, may be disposed in such a manner that a portion thereof appears to be discontinuous. Specifically, since the liquid crystal device 100 is uniaxially oriented, the pixel peripheral electrode may be provided along a diagonal direction along at least the uniaxial direction.

Modification Example 2

In addition to the above-described liquid crystal device 100, for example, the invention may be applied to an organic EL, an electronic paper or the like.

Modification Example 3

As described above, the projection type display device 1000 as an electronic apparatus is described as an example, the invention is not limited to this, and for example, may be applied to a viewer, a view finder, a head mount display and the like. In addition, the invention may be applied to various electronic apparatuses such as a liquid crystal television, a cellular phone, an electronic note, a word processor, a view finder type or direct-view monitor type video tape recorder, a work station, a mobile type personal computer, a videophone, a POS terminal, a pager, an electronic calculator, a touch panel, an electrophoresis device such as electronic paper, a car navigation device or the like.

What is claimed is:
1. A liquid crystal device comprising:
an element substrate that has a pixel region;
a counter substrate disposed so as to be opposite the element substrate;
a seal member that bonds the element substrate and the counter substrate; and
a liquid crystal layer interposed between the element substrate and the counter substrate,
wherein the element substrate includes:
a data line driving circuit disposed between the pixel region and a first side of the element substrate;
a scanning line driving circuit disposed between the pixel region and a second side of the element substrate intersecting the first side;
a first signal supply line that supplies a signal to the data line driving circuit;
a first connection terminal electrically connected to the first signal supply line;
a second signal supply line that supplies a signal to the scanning line driving circuit;

a second connection terminal electrically connected to the second signal supply line;
a pixel peripheral electrode disposed between the pixel region and the scanning line driving circuit on the second side, and between the pixel region and the data line driving circuit on the first side;
a peripheral electrode line electrically connected to the pixel peripheral electrode; and
a third connection terminal electrically connected to the peripheral electrode line,
wherein the third connection terminal is disposed between the first connection terminal and the second connection terminal, and
wherein the peripheral electrode line is disposed so as not to planarly intersect with at least a partial line of the first signal supply line and the second signal supply line.

2. The liquid crystal device according to claim 1,
wherein the first signal supply line and the second signal supply line include a power supply line and a pulse signal line, and
wherein the peripheral electrode line is disposed so as not to planarly intersect with the pulse signal line.

3. The liquid crystal device according to claim 1,
wherein the peripheral electrode line is disposed so as not to planarly overlap with a start pulse signal line and the second signal supply line between at least the start pulse signal line among the first signal supply line and the second signal supply line.

4. The liquid crystal device according to claim 1,
wherein the peripheral electrode line is disposed so as not to planarly overlap with a selector signal line and a scan signal supply line between at least the selector signal line among the first signal supply line and the scan signal supply line.

5. The liquid crystal device according to claim 1,
wherein the pixel peripheral electrode is disposed to be connected so as to surround the pixel region.

6. The liquid crystal device according to claim 1,
wherein the pixel peripheral electrode is provided in the same layer as a pixel electrode.

7. The liquid crystal device according to claim 6,
wherein the peripheral electrode line is electrically connected to the pixel peripheral electrode in a portion close to the pixel region.

8. An electronic apparatus comprising the liquid crystal device according to claim 1.

9. The liquid crystal device according to claim 1,
wherein each of the first connection terminal, the second connection terminal and the third connection terminal are disposed along one side of the element substrate.

10. The liquid crystal device according to claim 1,
wherein each of the first connection terminal, the second connection terminal and the third connection terminal are disposed along the first side of the element substrate.

11. The liquid crystal device according to claim 1,
wherein the pixel peripheral electrode is applied with a potential that improves an uneven distribution of a negative or positive ionic impurity in the liquid crystal layer.

12. The liquid crystal device according to claim 1,
wherein the element substrate has a first orientation film and the counter substrate has a second orientation film, each of the first orientation film and the second orientation film being obliquely deposited from a predetermined direction.

13. A liquid crystal device comprising:
an element substrate that has a pixel region;
a counter substrate disposed so as to be opposite the element substrate;
a seal member that bonds the element substrate and the counter substrate; and
a liquid crystal layer interposed between the element substrate and the counter substrate,
wherein the element substrate includes:
a data line disposed between the pixel region and a first side of the element substrate;
a scanning line driving circuit disposed between the pixel region and a second side of the element substrate intersecting the first side;
a sampling circuit disposed between the pixel region and the first side of the element substrate;
a first signal supply line that supplies a signal to the data line;
a first connection terminal electrically connected to the first signal supply line;
a second signal supply line that supplies a signal to the scanning line driving circuit;
a second connection terminal electrically connected to the second signal supply line;
a pixel peripheral electrode disposed between the pixel region and the scanning line driving circuit on the second side, and between the pixel region and the sampling circuit on the first side;
a peripheral electrode line electrically connected to the pixel peripheral electrode; and
a third connection terminal electrically connected to the peripheral electrode line,
wherein the third connection terminal is disposed between the first connection terminal and the second connection terminal, and
wherein the peripheral electrode line is disposed so as not to planarly intersect with at least a partial line of the first signal supply line and the second signal supply line.

14. A liquid crystal device comprising:
an element substrate that has a pixel region;
a counter substrate disposed so as to be opposite the element substrate;
a seal member that bonds the element substrate and the counter substrate; and
a liquid crystal layer disposed between the element substrate and the counter substrate,
wherein the element substrate includes:
a data line driving circuit disposed between the pixel region and a first side of the element substrate;
a scanning line driving circuit disposed between the pixel region and a second side of the element substrate intersecting the first side;
a first signal supply line that supplies a signal to the data line driving circuit;
a first terminal electrically connected to the first signal supply line;
a second signal supply line that supplies a signal to the scanning line driving circuit;
a second terminal electrically connected to the second signal supply line;
a peripheral electrode disposed between the pixel region and the scanning line driving circuit on the second side, and between the pixel region and the a data line driving circuit on the first side;
a peripheral electrode line electrically connected to the peripheral electrode; and a third terminal electrically connected to the peripheral electrode line,
wherein the third terminal is disposed between the first terminal and the second terminal, and
wherein the peripheral electrode line is disposed between the first terminal and the second terminal.

* * * * *